United States Patent [19]

Beck et al.

[11] Patent Number: 4,639,322

[45] Date of Patent: Jan. 27, 1987

[54] BIOPOLYMER COMPOSITIONS HAVING ENHANCED FILTERABILITY

[75] Inventors: Donald Beck, Ledyard; James W. Miller, Mystic; William C. Wernau, Groton; Thomas B. Young, III, North Stonington, all of Conn.

[73] Assignee: Pfizer Inc., New York, N.Y.

[21] Appl. No.: 644,593

[22] Filed: Aug. 27, 1984

Related U.S. Application Data

[63] Continuation-in-part of Ser. No. 548,473, Nov. 3, 1983, abandoned.

[51] Int. Cl.⁴ .............................................. E21B 43/22
[52] U.S. Cl. .................................. 252/8.554; 536/114
[58] Field of Search ................. 252/8.5, 8.55; 536/114

[56] References Cited

U.S. PATENT DOCUMENTS

| | | | |
|---|---|---|---|
| 3,300,375 | 1/1967 | Wehner | 167/22 |
| 3,520,976 | 7/1970 | Buckman et al. | 252/8.55 D |
| 3,996,378 | 12/1976 | Payton | 424/302 |
| 4,119,491 | 10/1978 | Wellington | 536/114 |
| 4,119,546 | 10/1978 | Wernau | 252/8.550 |
| 4,135,979 | 1/1979 | Corley et al. | 536/114 |
| 4,282,321 | 8/1981 | Wernau | 435/104 |
| 4,352,741 | 10/1982 | Wernau | 252/8.55 D |
| 4,457,372 | 7/1984 | Doster et al. | 252/8.55 D |
| 4,517,101 | 5/1985 | Williams et al. | 536/114 |

OTHER PUBLICATIONS

Wehner and Hinz, *Developments in Industrial Microbiology*, vol. 21, 1980, pp. 404-410.

Ingram, L. O., *J. Bacteriol.*, Apr. 1981, pp. 331-336.

Hatefi and Hanstein, *Proc. N.A.S.* vol. 62, No. 10, 1969, pp. 1129-1136.

*Primary Examiner*—John F. Terapane
*Assistant Examiner*—T. J. Wallen
*Attorney, Agent, or Firm*—Charles J. Knuth; Peter C. Richardson; Robert F. Sheyka

[57] ABSTRACT

Biopolymers comprising xanthomonas and methylene bis (thiocyanate) are disclosed.

22 Claims, No Drawings

BIOPOLYMER COMPOSITIONS HAVING ENHANCED FILTERABILITY

RELATED U.S. APPLICATIONS

This application is a continuation-in-part of U.S. Ser. No. 548,473 filed Nov. 3, 1983, now abandoned.

BACKGROUND OF THE INVENTION

Biopolymers, particularly those produced by members of the genus Xanthomonas, have found utility for the past several years in the field of enhanced oil recovery. The filterability of these materials is a key gauge of their injectivity; they must also pass readily through subterranean formations in order to aid in oil recovery.

It has been known for some years that methylene bis(thiocyanate) (MBT) is a potent biocide for a number of microorganisms. Wehner and Hinz (*Developments In Industrial Microbiology* vol 21, 1980, p 404–410) demonstrate its use against numerous species of bacteria and also against several algae. U.S. Pat. No. 3,300,375 (Wehner) teaches growth inhibition of sulfate reducing bacteria with MBT and suggests that MBT be added to water used in oil well flooding operations in order to kill subterranean sulfate reducing bacteria which plug wells. U.S. Pat. No. 3,996,378 (Payton) teaches a microbiocide composition made up of Xanthan gel and from 5–20% of MBT which is said to be less toxic than solvent based compositions in various industrial applications.

Another characteristic of inorganic thiocyanates that has been noted is their ability to break up cells. For example, L. O. Ingram (*J. Bacteriol.* April 1981, p 331–336) has investigated the chaotropic effect of sodium thiocyanate on *E. coli* and Hatefi and Hanstein (Proc. N.A.S. vol 62 no. 10, 1969, p 1129–1136) have investigated the more general effect of chaotropic agents, including thiocyanate anion on water solubility of membranes and particulate proteins.

The present invention, for the first time, discloses a biopolymer composition of suprisingly superior filterability made up of Xanthan biopolymer and very small amounts of MBT, an organic thiocyanate.

SUMMARY OF THE INVENTION

The present invention comprises a composition for use in enhanced oil recovery comprising from about 1.5–20 weight percent Xanthomonas biopolymer in the form of a whole fermentation broth or a concentrated fermentation broth and from about 0.0008–3 weight percent methylene bis(thiocyanate), the composition having a pH above about 3.5. The composition is preferred wherein the biopolymer is present in the amount of from about 3.0–18 weight percent, the methylene bis(thiocyanate) is present in an amount of from about 0.0128–0.0512 weight percent and the pH is above about 5.0.

The composition is also preferred wherein the biopolymer is in the form of whole Xanthomonas fermentation broth containing from about 1.5–6 weight percent biopolymer, the broth being substantially free of insoluble matter having a particular size greater than about 3 microns.

The composition is especially preferred wherein the biopolymer is in the form of a concentrated Xanthomonas fermentation broth containing from about 6–20 weight percent biopolymer, the broth being substantially free of insoluble matter having a particle size greater than about 3 microns. The compositions named above which also contain from about 300–5000 ppm formaldehyde are also preferred. The compositions named above are also preferred when they are prepared by subjecting them to a post-shearing step sufficient to cause a reduction in viscosity effectiveness of said biopolymer of from about 5–30%, preferably of from about 10–15 percent.

The present invention also comprises a process to produce a directly injectable Xanthomonas biopolymer solution comprising the steps of:

(1) admixing a Xanthomonas biopolymer fermentation broth or concentrated fermentation broth containing from about 1.5–20 weight percent Xanthomonas biopolymer, with methylene bis(thiocyanate) to a concentration of methylene bis(thiocyanate) of from about 0.0008–3 weight percent in the admixture, said admixture having a pH above about 3.5;

(2) after a period of at least about 3 hours, admixing said admixture with from about 300–5000 ppm formaldehyde; and (3) diluting said second admixture to a concentration of about 100 to 4000 ppm biopolymer in a vigorous shear field.

The process is preferred wherein said biopolymer is present in an amount of from about 3.0–18 weight percent, said pH is above about 5 and said methylene bis(thiocyanate) is present in an amount of from about 0.0128–0.0512 weight percent in the initial admixture.

The process is also preferred wherein the biopolymer is in the form of whole Xanthomonas fermentation broth containing from about 1.5–6 weight percent biopolymer, the broth being substantially free of insoluble matter having a particle size greater than about 3 microns.

The process is especially preferred wherein the biopolymer is in the form of a concentrated Xanthomonas fermentation broth containing from about 6–20 weight percent biopolymer, the broth being substantially free of insoluble matter having a particle size greater than about 3 microns.

A method for the recovery of crude oil from an oil-bearing subterranean formation comprising injecting into the formation the diluted and sheared compositions named above is also a part of this invention.

DETAILED DESCRIPTION OF THE INVENTION

The biopolymers suitable in the present invention are those produced by fermentation of members of the genus Xanthomonas, in particular *Xanthomonas campestris*, although numerous other species can be employed. Such biopolymers are well known and the literature abounds with their method of preparation. Of particular usefulness in this invention are the biopolymers produced by the processes of U.S. Pat. No. 4,119,546 and U.S. Pat. No. 4,282,321.

It is expected that similarly useful biopolymer compositions having improved filterability can be produced using MBT-treated broths prepared from other Gram-negative, biopolymer-producing microorganisms, particularly members of the genera Pseudomonas, Alcaligenes, Erwinia, Klebsiella, Arthrobacter and related genera.

Methylene bis(thiocyanate) is a product of commerce and it is available from numerous commercial sources. Since MBT is an expensive chemical as well as a toxic one, both economic and environmental advantage is gained by using as little as possible as in the present invention. The formaldehyde employed as an optional ingredient in this invention can be any of a variety of ordinary commercial solutions.

Other thiocyanate-containing anti-microbial agents are expected to have similar filterability-improving antimicrobial activity. Examples of such substances include:

(a) halomethylthiocyanates (chloro-, bromo-, iodo-);
(b) vinylene thiocyanates;
(c) chloroethylene bis(thiocyanate);
(d) thiocyanomethylmercaptobenzothiazole;
(e) trihalomethylthiocyanates (chloro-, bromo-);
(f) 1,2,3-tri(thiocyanato)propane; and
(g) 1,2-dibromoethylene bis(thiocyanate).

In preparing the novel compositions of this invention MBT typically will be added directly to the fermentation tank containing the biopolymer while the mixer-agitator is operating. This material can then optionally be concentrated by a variety of methods including ultrafiltration (see U.S. Pat. No. 3,541,006 and U.S. Pat. No. 4,299,825 for example) and evaporation. Alternatively, the fermentation broth can be concentrated with subsequent addition of MBT. If ultrafiltration is used, a convenient method is to add MBT to the ultrafilter's recirculation tank near the end of the concentration cycle. This minimizes MBT loss in the ultrafiltrate. If the MBT treated broth does not have the viscosity characteristics desired for a particular use, it is often desirable to shear the composition in a homogenizer or colloid mill. This shear treatment results in a reduction in effective viscosity.

If formaldehyde is to be used, it will also be added at a later time. A period of at least about 3 hours should elapse before formaldehyde addition and up to 48 hours and even longer is possible. The product is then packaged directly for storage or shipment.

It has been found that the invention works well when fresh water or brines (including high salinity and high hardness brines) are used for dilution of admixtures containing broth and MBT with or without formaldehyde. It is necessary to subject the diluted composition to sufficient shear for a sufficient period of time to achieve uniform dispersion of the MBT-containing broth. In the laboratory the method of Waring Blender shear disclosed in U.S. Pat. No. 4,119,546 works well. For field use any of a number of commercial homogenizers or blenders can be used. Other additives commonly used in oil fields can also be added. These include oxygen scavengers, corrosion inhibitors etc. The additives should be chemically and physically compatible with the biopolymer so as not to impair injectivity.

The pH stability of MBT in Xanthomonas campestris fermentation broth was determined as follows. An unpreserved (no formaldehyde added) xanthan broth was prepared according to the method of U.S. Pat. No. 4,119,546. MBT in the form of Busan 110 (Buckman Labs, Memphis, Tenn.) was added to pH pre-adjusted broth samples (NaOH, HCl or $H_2SO_4$ added for pH adjustment) to provide an active MBT concentration of 225 ppm. Initial readings were obtained as quickly as possible (~60 mins.) after treatment of broth. A test was also conducted in pure $H_2O$ with added Busan 110. Active MBT concentration was determined by Gas Chromatography after sample dilution with water, extraction with dichloromethane, extract concentration, drying, and dissolution in ethyl acetate. Pure MBT was used for internal multilevel standard calibration. Results are shown in Table I.

TABLE I

| Broth pH | Half Life (hrs.) |
|---|---|
| 4 | 5300 (approx.) |
| 5 | 1400 (approx.) |
| 6 | 500 (approx.) |
| 7 | 79 |
| 7.5 (water) | 23 |

These data clearly show the enhanced stability of MBT at lower pH.

The activity of MBT against cells of *Xanthomonas campestris* was tested at various pH levels in formaldehyde-free broth (see Table 1). Broths were adjusted to various pH levels as indicated and turbidometric and microscopic examination was made to determine if cell lysis occurred. Results are shown in Table II as a function of MBT concentration and pH.

TABLE II

| Sample | pH | MBT Level (ppm) | Lysis @ 24 Hrs. |
|---|---|---|---|
| Control | 5.1 | 0 | None |
| 1 | 4.0 | 8.0 | None |
| 2 | 4.0 | 16.0 | None |
| 3 | 5.2 | 8.0 | + ++ |
| 4 | 5.2 | 16.0 | ++ |
| 5 | 6.0 | 8.0 | ++ +++ |
| 6 | 6.0 | 16.0 | ++ |
| 7 | 7.0 | 8.0 | +++ ++++ |
| 8 | 6.9 | 16.0 | ++++ |

These results shown that MBT induced cell lysis occurs more rapidly as pH increases.

Filterability is a highly useful gauge of how well the biopolymer composition will perform under oil field conditions. The Millipore filterability test is an experimental procedure that measures flow rate through a Millipore filter (0.45 to 5.0μ pore size) as a function of volume under a constant pressure of 40 psig. The filter ratio is the ratio of the time to collect the fourth 250 ml of mobility control solution to the time to collect the first 250 ml of mobility control solution. A filter ratio of 1.0 indicates that the solution has no plugging tendencies. An acceptable mobility control solution has a filter ratio of 1 to 3 (0.45 to 5μ Millipore filter), preferably ≦1.7.

The desired filter ratio and Millipore filter size for testing of a particular mobility control solution are dependent on the permeability of the subterranean stratum of the oil field for which oil displacement is planned.

An alternative test involves the prefiltration of at least 1 liter of mobility control solution at 1450 ppm of biopolymer concentration through a 5 micron Millipore filter followed by a second filtration at a 40 psig pressure drop across a 1.2 micron Versapore filter. The number of milliliters of solution passing through the 1.2 micron filter in 600 seconds or less is taken as a measure of injectivity.

The examples to follow are illustrative and do not limit the scope of the claims.

EXAMPLE 1

A standard untreated xanthan broth was prepared according to the method of U.S. Pat. No. 4,119,546. Broth viscosity assay gave 4.5% activity in the broth. 150 g samples of broth were taken. One was treated with 200 ppm MBT (active) and the other was untreated. After 2 days samples were diluted in a high hardness test brine and were tested for Versapore 1.2 micron filterability after 5.0 micron Millipore prefiltration. Results are shown below.

| Sample | Versapore Filterability (ml/sec) |
|---|---|
| Untreated | 250 ml/600 sec |
| with 200 ppm MBT | 1000 ml/119 sec |

This demonstrates the dramatic enhancement of MBT on xanthan broth filterability.

EXAMPLE 2

Samples of 150 g each were prepared from the untreated broth over a range of pH and MBT concentrations and compared with formaldehyde controls (3000 ppm formaldehyde) after 2 days. Results for diluted and sheared broths (1450 ppm biopolymer) are shown below. HCl or NaOH were used for pH adjustment under rapid mixing conditions. The data indicate the number of mls. which passed through the 1.2 micron rated Versapore filter and the number of seconds tested. Tests were stopped at 600 seconds or 1000 ml, whichever came first.

Test Conditions: Std. 5 micron filtration in Test Brine with 70 ppm Triton X-100, 500 ppm concentration xanthan

| | | | 5μ Filtration Data | | | |
|---|---|---|---|---|---|---|
| | | | Turbidity | | | $F.t.^3$ |
| Sample | Stabilizer | % Xanthan | $NTU^1$ | pH | $F.R.^2$ | (sec) |
| 1 | MBT | 4.59 | 7 | 7.2 | 1.2 | 22.4 |
| 2 | MBT | 4.53 | 7 | 7.2 | 1.3 | 23.7 |
| 3a | MBT | 4.41 | 6 | 7.1 | 1.2 | 19.5 |
| 3b | $F^4$ | 4.41 | 20 | 5.9 | 240 ml/600 sec. | |
| 4 | MBT | 4.41 | 8 | 7.1 | 1.3 | 12.3 |
| 5a | MBT | 3.13 | 10 | 7.2 | 1.6 | 25.4 |
| 5b | F | 3.13 | 25 | 6.3 | 1.5 | 41.1 |
| 6 | MBT | 4.53 | 8 | 7.1 | 2.2 | 41.0 |
| 7a | MBT | 2.85 | 11 | 7.2 | 1.8 | 23.2 |
| 7b | F | 2.85 | 28 | 6.2 | 220 ml/600 sec. | |
| 8 | MBT | 4.44 | 6 | 7.1 | 1.1 | 19.0 |
| 9 | MBT | 4.47 | 8 | 7.1 | 1.3 | 21.3 |
| 10 | MBT | 4.28 | 6 | 7.2 | 1.1 | 21.2 |
| 11 | MBT | 4.28 | 10 | 7.1 | 1.3 | 20.6 |
| 12 | MBT | 4.18 | 14 | 7.2 | 1.2 | 22.9 |

[1] Nephelometric Turbidity Units, HACH Model 2100A
[2] Filter ratio through 5.0μ Millipore filter
[3] Filtration time in seconds for filtration of 1000 mls. solution
[4] Formaldehyde These results clearly show that MBT improves the

| | Control formaldehyde | MBT conc. (ppm) | | | | | | | |
|---|---|---|---|---|---|---|---|---|---|
| pH | only) | 4 | 8 | 16 | 32 | 64 | 128 | 256 | 512 |
| 3.5 | 330/600 | | | | 422/600 | | 510/600 | | 610/600 |
| 5.0 | 325/600 | | 335/600 | | | 375/600 | | 1000/107 | |
| 6.5 | 340/600 | 313/600 | | 528/600 | | | 1000/131 | | |
| 8.5 | 335/600 | | 450/600 | | 365/600 | | 1000/151 | | 1000/103 |

The results clearly show the superior filterability obtained using higher concentrations of MBT and pH levels above 3.5. However, it is clear that even at the low pH levels, filterability improves.

EXAMPLE 3

To test the effect of MBT on injectivity of diluted xanthan broth, a series of 12 fermentations were performed according to conditions of U.S. Pat. No. 4,119,546 in 4 liter jar fermentors and 5.0 micron Millipore filtration tests and turbidity measurements were made. Three broths were split to receive formaldehyde additions at 3000 ppm in one aliquot and MBT additions at 167 ppm in the other aliquot. All other broths received 167 ppm MBT. Results are given below.

5.0μ filterability and reduces the turbidity of diluted Xanthan broths when compared to use of formaldehyde alone. Microscopic examination of samples confirmed cellular destruction and reduced particle size.

EXAMPLE 4

Example 3 was repeated using broths from standard production lots and performing sequential 5.0 micron Millipore filtration and 1.2 micron Versapore filtration. Results are shown below.

| | | | Xanthan conc. = 1000 ppm, no Triton used | | | | | |
|---|---|---|---|---|---|---|---|---|
| | | | | 5μ Filtration Data | | 1.2μ Versapore | | |
| Sample | Stabilizer | Conc. | $NTU(BF)^1$ | F.R. | F.t. | F.R. | F.t. | $NTU(AF)^2$ |
| 1 | MBT | 200 | 66.5 | 1.85 | 20 | 1.28 | 34 | 60 |
| 2 | F | 5500 | 75.0 | 740 ml/600 sec | | 1.90 | 64 | 60 |
| 3 | MBT | 200 | 35.0 | 2.30 | 30 | 8.02 | 287 | 30 |
| 4 | F | 4190 | 68.0 | 6.75 | 76 | 590 ml/600 sec | | 34 |

Filterability improved with both broths. Sample 1 improved from a plugging condition to a filterable status through a 5.0μ filter and Sample 3 did the same at 1.2μ after improving in filter ratio (F.R.) at 5.0μ.

EXAMPLE 5

Sample 3 of Example 4 was further tested, based on limited stability of MBT and the need for broad-spectrum biocidal effectiveness for broth preservation, by adding formaldehyde after MBT addition. Results are shown below.

| Sample | MBT (ppm) | Formaldehyde (ppm) | t (hrs.) | NTU (BF) | 5μ Millipore* FR | Ft | 1.2μ Millipore FR | Ft | NTU (AF) |
|---|---|---|---|---|---|---|---|---|---|
| 1 | 0 | 3000 | — | 63 | 3.08 | 89 | 420 ml/600 sec. | | 49 |
| 2 | 160 | 3000 | 0 | 59 | 4.51 | 64 | 430 ml/600 sec. | | 49 |
| 3 | 160 | 0 | — | 34 | 2.34 | 32 | 7.42 | 253 | 33 |
| 4 | 0 | 3000 | — | 60 | 4.36 | 88 | 360 ml/600 sec. | | 47 |
| 5 | 160 | 3000 | 1 | 52 | 3.53 | 52 | 340 ml/600 sec. | | 41 |
| 6 | 160 | 0 | — | 33 | 2.94 | 35 | 7.98 | 230 | 26 |
| 7 | 0 | 3000 | — | 62 | 4.52 | 89 | 280 ml/600 sec. | | 45 |
| 8 | 160 | 3000 | 3 | 49 | 5.07 | 75 | 380 ml/600 sec. | | 39 |
| 9 | 160 | 0 | — | 27 | 2.96 | 54 | 870 ml/600 sec. | | 23 |
| 10 | 160 | 3000 | 48 | 30 | 1.69 | 30 | 3.92 | 136 | 27 |
| 11 | 160 | 0 | — | 34 | 2.34 | 32 | 7.42 | 253 | 33 |

Here formaldehyde was added immediately after MBT addition (t=0) and 1 hr., 3 hrs. and 48 hrs. after MBT addition. The results show a noticeable inhibition of MBT effectiveness by formaldehyde if the latter is added too soon after MBT addition. More than 3 hrs. should elapse before formaldehyde addition. The 48 hr. results clearly show that the sequential use of MBT and formaldehyde is feasible and also indicate a further improvement in filterability when formaldehyde is added at least 3 hrs. after MBT addition.

EXAMPLE 6

Xanthan broth 2.51% assay was tested for the filterability as a function of formaldehyde addition time after MBT addition. Results are shown below for 500 ppm biopolymer concentration in test brine.

| MBT Concentration | Time Before HCHO Addition | HCHO Level | viscosity[4] (cps) | NTU (BF) | pH | 5μ Millipore FR | Ft 1000(sec.) | 1.2μ Millipore F.R. | F.t. | NTU (AF) |
|---|---|---|---|---|---|---|---|---|---|---|
| 168 ppm | — | — | 28.7 | 42.0 | 7.1 | 2.8 | 38 | 1.74 | 49 sec. | 36.0 |
| None | 0 Hr. | 3,000 ppm | 30.5 | 74.0 | 7.0 | 74.2 | 476 | 240 ml/600 sec. | | 49.0 |
| 168 | 3 Hrs. | 3,000 ppm | 30.3 | 34.0 | 7.0 | 3.2 | 35 | 2.17 | 58 sec. | 29.0 |
| 168 | 8 Hrs. | 3,000 ppm | 30.0 | 47.5 | 7.2 | 3.3 | 35 | 2.09 | 62 sec. | 37.0 |
| 168 | 1 Day | 3,000 ppm | 28.2 | 41.0 | 7.2 | 2.7 | 32 | 1.74 | 49 sec. | 33.0 |
| 168 | 2 Days | 3,000 ppm | 29.7 | 44.0 | 7.0 | 3.0 | 41 | 1.84 | 58 sec. | 32.5 |
| 168 | 4 Days | 3,000 ppm | 29.0 | 45.0 | 7.0 | 5.2 | 50 | 1.59 | 51 sec. | 41.0 |
| 168 | 7 Days | 3,000 ppm | 29.0 | 42.0 | 7.0 | 2.0 | 38 | 1.43 | 53 sec. | 35.0 |
| Dimethyl-formamide[1] | 0 Hr. | — | 32.3 | 55.0 | 7.0 | 41.0 | 474 | 220 ml/600 sec. | | 39.0 |
| ⅓ Dimethyl-formamide[2] | 0 Hr. | — | 33.4 | 52.0 | 7.0 | 870 ml/600 sec. | | 210 ml/600 sec. | | 37.5 |
| 168 ppm MBT WF[3] | 0 Hr. | — | 32.7 | 27.0 | 7.0 | 4.7 | 105 | 840 ml/600 sec. | | 22.0 |

[1]Unstabilized FLOCON 4800 Broth Containing 1,680 ppm dimethylformamide (DMF).
[2]Ibid, 560 ppm DMF.
[3]Water Formulated MBT Biocide.
[4]Viscosity at 6 R.P.M. on Brookfield Viscometer using UL adapter. (centipoise)

These results indicate that formaldehyde can be added at 3 hrs. or thereafter and the MBT effect will be evident. They also show that formulation of MBT in water rather than dimethylformamide and aromatic hydrocarbon (as in Busan 110) also improves filterability at 5μ and 1.2μ.

EXAMPLE 7

A standard xanthan broth was treated with MBT at various levels and sampled for biocidal effectiveness by plating on YM agar plates and by subculture (1 ml into 50 ml sterile trypticase soy broth). Flasks and plates were incubated at 28°–30° C. Flasks were held on a rotary shaker for 7 days and examined for turbidity. Plates were similarly checked for colony development. Results are shown below.

| Biocide | Level (ppm) | Subculture Data (Days) 0 | 1 | 2 | 4 | 7 | (Xanthomonas Growth) |
|---|---|---|---|---|---|---|---|
| None | — | + | + | + | + | + | |
| Formaldehyde | 2000 | – | – | – | – | – | |
| MBT | 167 | – | – | – | – | – | |
| MBT | 501 | – | – | – | – | – | |

The experiment was repeated and extended to longer times and to cover lower MBT concentrations. Results are found below.

| Biocide | Level (ppm) | (Days) 0 | 1 | 2 | 3 | 7 | (Months) 1 | 2 | 3 |
|---|---|---|---|---|---|---|---|---|---|
| None | — | + | + | + | + | + | + | + | + |
| Formaldehyde | 2000 | ± | ± | ± | – | – | – | – | – |
| MBT | 167 | – | – | – | – | – | – | – | – |
| | 134 | – | – | – | – | – | – | – | – |
| | 101 | – | – | – | – | – | – | – | – |
| | 68 | – | – | – | – | – | – | – | – |
| | 35 | – | – | – | – | – | – | – | – |

EXAMPLE 8

The effect of pH on MBT biocidal effectiveness against *X. campestris* was checked at pH 5, 6 and 7. Results are shown below.

| Biocide | Level (ppm) | pH | Subculture Data (Xanthomonas Growth) |
|---|---|---|---|
| None | — | 5 | + |

-continued

| Biocide | Level (ppm) | pH | Subculture Data (Xanthomonas Growth) |
|---|---|---|---|
| Formaldehyde | 3000 | 5 | — |
| MBT | 167 | 5 | — |
| None | — | 6 | + |
| Formaldehyde | 3000 | 6 | — |
| MBT | 167 | 6 | — |
| None | — | 7 | + |
| Formaldehyde | 3000 | 7 | — |
| MBT | 167 | 7 | — |

EXAMPLE 9

The effect of shearing on effective viscosity was tested and is shown below. Two laboratory prepared Xanthomonas broths were employed. Samples of about 5 gallons were sheared in a Manton-Gaulin Homogenizer Model 15M at the operating pressures shown and the increased filter ratios obtained in the sheared samples are evident.

| Sample | Shear PSI | MBT | Xanthan Assay | 1.2μ Millipore FR | 1.2μ Millipore FT |
|---|---|---|---|---|---|
| 1 (control) | — | 200 ppm | 3.53% | 340 cc | 600 sec |
| 1 (shear) | 250 | 200 ppm | 3.17% | 690 cc | 600 sec |
| 2 (control) | — | 168 ppm | 3.22% | 95 cc | 600 sec |
| 2 (shear) | 250 | 168 ppm | 3.0% | 580 cc | 600 sec |

EXAMPLE 10

Another laboratory prepared xanthan broth was treated with 167 ppm MBT and was divided into 5, five gallon portions for an evaluation of the effect of shear on effective viscosity. The model 15M Manton-Gaulin Homogenizer was used. The results were as follows:

| Shear PSI | Xanthan Assay | 1.2μ Millipore FR | 1.2μ Millipore FT |
|---|---|---|---|
| — | 3.2% | 403 cc | 600 sec |
| 100 | 3.1% | 595 cc | 600 sec |
| 200 | 3.0% | 910 cc | 600 sec |
| 250 | 2.9% | 1000 cc | 332 sec |
| 300 | 2.5% | 1000 cc | 135 sec |

We claim:

1. A composition for use in enhanced oil recovery comprising from about 1.5-20 weight percent Xanthomonas biopolymer in the form of whole Xanthomonas fermentation broth or concentrated Xanthomonas fermentation broth and from about 0.0008-3 weight percent methylene bis(thiocyanate), said amount of methylene bis(thiocyanate) sufficient to lyse Xanthomonas cells, said composition having a pH above about 3.5.

2. The composition of claim 1 wherein said biopolymer is present in the amount of from about 3.0-18 weight percent, said methylene bis(thiocyanate) is present in an amount of from about 0.0128-0.0512 weight percent and said pH is above about 5.0.

3. The composition of claim 2 wherein said biopolymer is in the form of whole Xanthomonas fermentation broth containing from about 1.5-6 weight percent biopolymer, said broth being substantially free of insoluble matter having a particle size greater than about 3 microns.

4. The composition of claim 2 wherein said biopolymer is in the form of a concentrated Xanthomonas fermentation broth containing from about 6-20 weight percent biopolymer, said broth being substantially free of insoluble matter having a particle size greater than about 3 microns.

5. The composition of claim 4 which also contains from about 300-5000 ppm formaldehyde, said amount of formaldehyde added after lysis of Xanthomonas cells by methylene bis(thiocyanate).

6. The composition of claim 2 which also contains from about 300-5000 ppm formaldehyde, said amount of formaldehyde added after lysis of Xanthomonas cells by methylene bis(thiocyanate).

7. The composition of claim 3 which also contains from about 300-5000 ppm formaldehyde, said amount of formaldehyde added after lysis of Xanthomonas cells by methylene bis(thiocyanate).

8. The composition of claim 1 wherein said biopolymer is in the form of whole Xanthomonas fermentation broth containing from about 1.5-6 weight percent biopolymer, said broth being substantially free of insoluble matter having a particle size greater than about 3 microns.

9. The composition of claim 8 which also contains from about 300-5000 ppm formaldehyde, said amount of formaldehyde added after lysis of Xanthomonas cells by methylene bis(thiocyanate).

10. The composition of claim 1 wherein said biopolymer is in the form of a concentrated Xanthomonas fermentation broth containing from about 6-20 weight percent biopolymer, said broth being substantially free of insoluble matter having a particle size greater than about 3 microns.

11. The composition of claim 10 which also contains from about 300-5000 ppm formaldehyde, said amount of formaldehyde added after lysis of Xanthomonas cells by methylene bis(thiocyanate).

12. The composition of claim 1 which also contains from about 300-5000 ppm formaldehyde, said amount of formaldehyde added after lysis of Xanthomonas cells by methylene bis(thiocyanate).

13. The composition of claim 1 prepared by subjecting said composition to shear sufficient to cause a reduction in viscosity effectiveness of said biopolymer of from about 5-30 percent.

14. The composition of claim 1 prepared by subjecting said composition to shear sufficient to cause a reduction in viscosity effectiveness of said biopolymer of from about 10-15 percent.

15. A process to produce directly injectable Xanthomonas biopolymer solution comprising the steps of:
(1) admixing Xanthomonas biopolymer fermentation broth or concentrated fermentation broth containing from about 1.5-20 weight percent Xanthomonas biopolymer, with methylene bis(thiocyanate) to a final concentration of methylene bis(thiocyanate) of from about 0.0008-3 weight percent in the admixture, said concentration of methylene bis thiocyanate sufficient to lyse Xanthomonas cells, said admixture having a pH above about 3.5;
(2) after a period of at least about 3 hours, admixing said admixture with from about 300-5000 ppm formaldehyde; and
(3) diluting said second admixture to a concentration of from about 100-4000 ppm biopolymer in a vigorous shear field.

16. The process of claim 15 wherein said methylene bis(thiocyanate) is present in an amount of from about 0.0128-0.0512 weight percent and said pH is above about 5.0 and said biopolymer is present in an amount of from about 3.0-18 weight percent.

17. The process of claim 16 wherein said biopolymer is in the form of whole Xanthomonas fermentation broth containing from about 1.5-6 weight percent biopolymer, said broth being substantially free of insoluble matter having a particle size greater than about 3 microns.

18. The process of claim 16 wherein said biopolymer is in the form of a concentrated Xanthomonas fermentation broth containing from about 6-20 weight percent biopolymer, said broth being substantially free of insoluble matter having a particle size greater than about 3 microns.

19. The process of claim 15 wherein said biopolymer is in the form of whole Xanthomonas fermentation broth containing from about 1.5-6 weight percent biopolymer, said broth being substantially free of insoluble matter having a particle size greater than about 3 microns.

20. The process of claim 15 wherein said biopolymer is in the form of a concentrated Xanthomonas fermentation broth containing from about 6-20 weight percent biopolymer, said broth being substantially free of insoluble matter having a particle size greater than about 3 microns.

21. A method for the recovery of crude oil from an oil-bearing subterranean formation comprising injecting into the formation the composition comprising from about 1.5-20 weight percent Xanthomonas fermentation broth and from about 0.0008-3 weight percent methylene bis(thiocyanate), said amount of methylene bis(thiocyanate) sufficient to lyse Xanthomonas cells, said composition having a pH above about 3.5, diluted prior to said injection to a concentration of from about 100-4000 ppm biopolymer in a vigorous shear field and recovering crude oil from said formation.

22. A method according to claim 21 wherein said composition also contains from about 300-5000 ppm formaldehyde.

* * * * *